United States Patent [19]

Murphy et al.

[11] Patent Number: 4,779,504

[45] Date of Patent: Oct. 25, 1988

[54] DEVICE FOR FANCY CUTTING MELONS AND THE LIKE

[75] Inventors: Robert W. Murphy, Newington; Mark L. Ouellette, New Britain, both of Conn.

[73] Assignee: Eugene Ouellette, East Hartford, Conn.

[21] Appl. No.: 125,809

[22] Filed: Nov. 24, 1987

[51] Int. Cl.$^4$ .......................... B26D 1/02; B26B 29/00
[52] U.S. Cl. .......................................... 83/856; 83/440; 83/440.1; 83/857; 83/879; 30/286; 30/290
[58] Field of Search ................. 83/856, 857, 431, 879, 83/880, 881, 882, 54, 56, 46, 440.1, 440; 30/286, 289, 290, 291

[56] References Cited

U.S. PATENT DOCUMENTS

| | | | |
|---|---|---|---|
| 1,984,034 | 12/1934 | Ryan | 83/440 |
| 2,735,466 | 2/1956 | Krstinich | 83/440 X |
| 3,948,182 | 4/1976 | Lamp | 83/431 X |
| 4,457,070 | 7/1984 | Reeves | 30/355 X |

*Primary Examiner*—E. R. Kazenske
*Assistant Examiner*—Scott A. Smith

*Attorney, Agent, or Firm*—McCormick, Paulding and Huber

[57] ABSTRACT

A device for effecting continuous annular fancy cuts such as serrations around melons and the like comprises an elongated substantially linear base and support member having a trough-like cross section. A flat central portion of the base and support member carries an elongated upstanding generally linear cutter which extends longitudinally atop the member and which is adapted at an upper edge to sever the skin of melons and the like. The shape of the cutter when viewed from above in one embodiment is a conventional saw-tooth and the saw tooth cut or serration is provided continuously around a melon midsection by rolling the same along the length of the cutter. Side portions of the trough-like base and support member are oppositely inclined at approximately thirty degrees (30) to urge the melon toward a linear or straight line revolution along and atop the cutter. The height of the cutter relative to the base and support member is such that the melon is severed to a desired depth through and beneath the skin to permit ready separation into half sections.

3 Claims, 5 Drawing Sheets

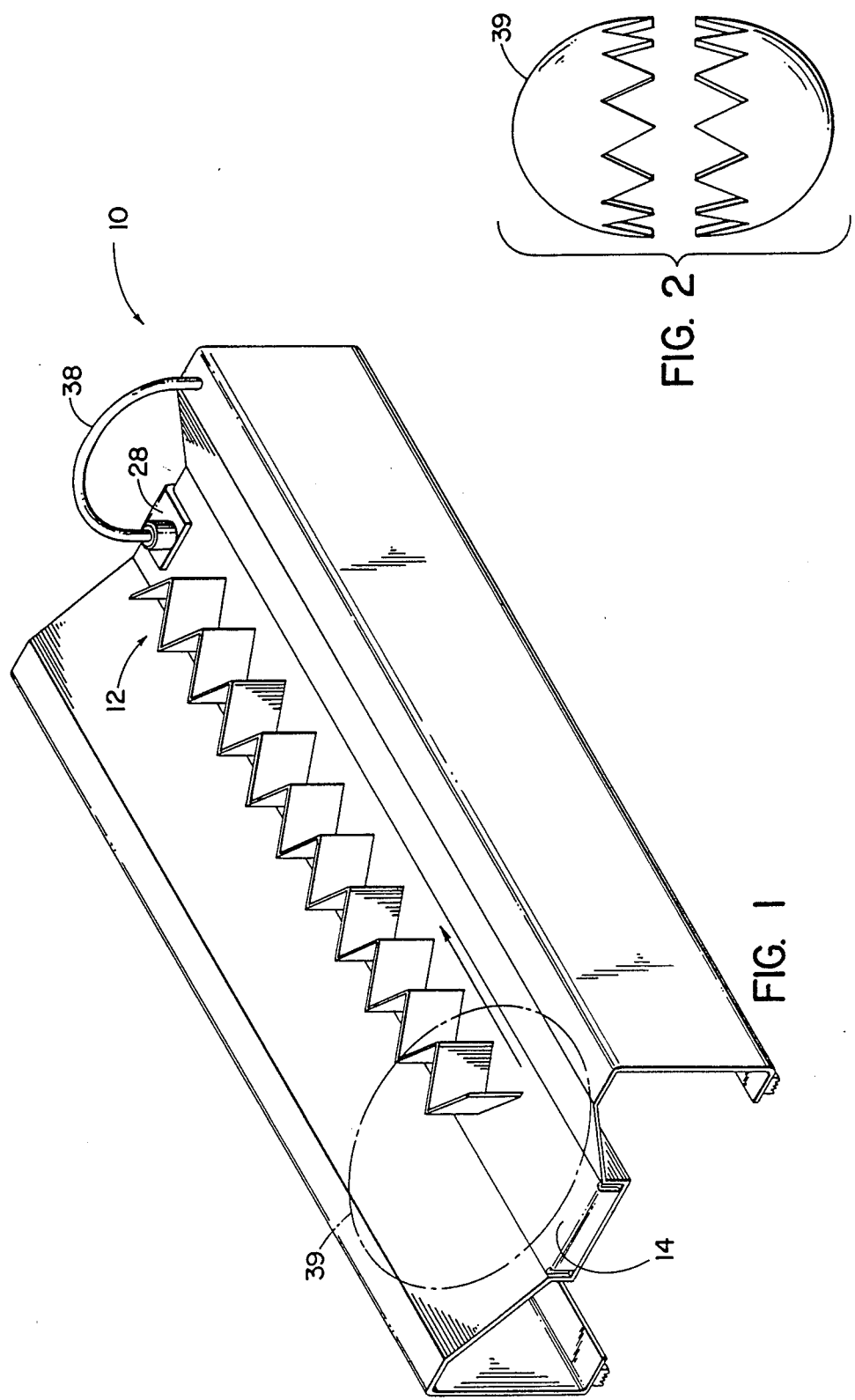

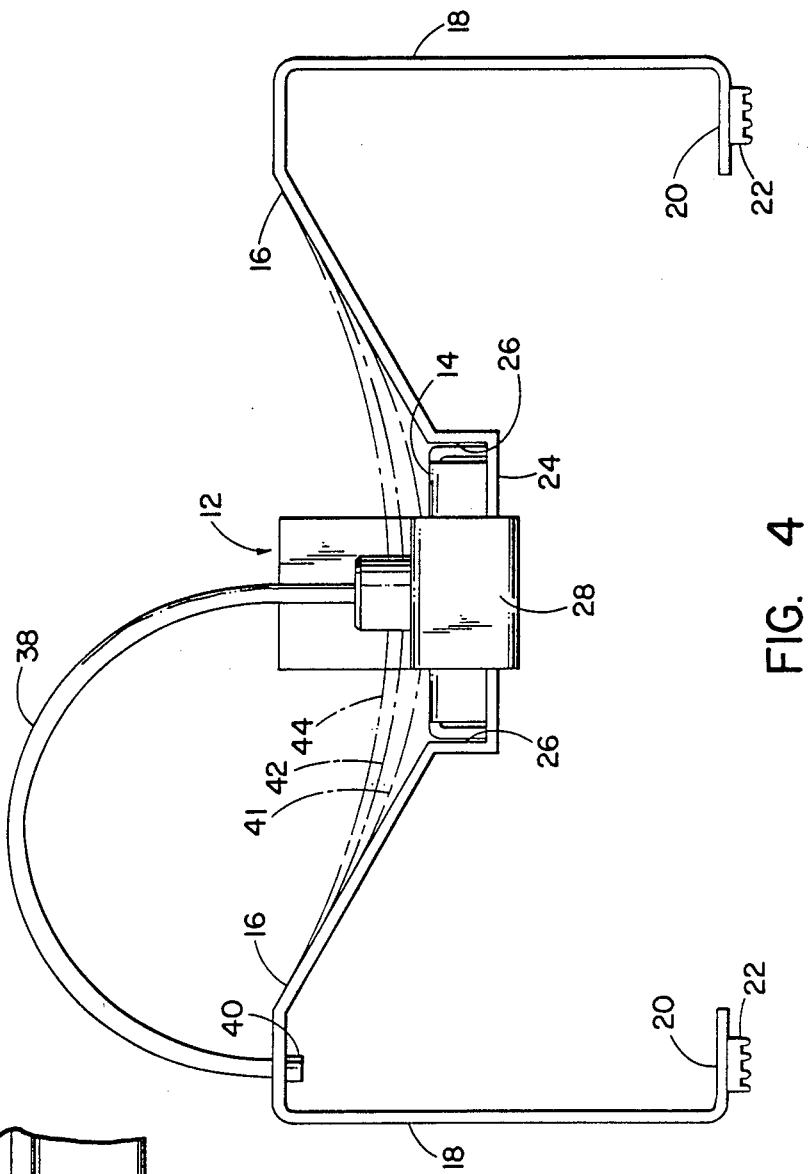
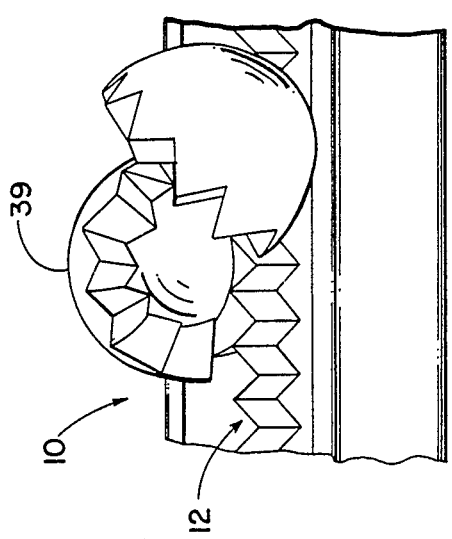
FIG. 4
FIG. 3

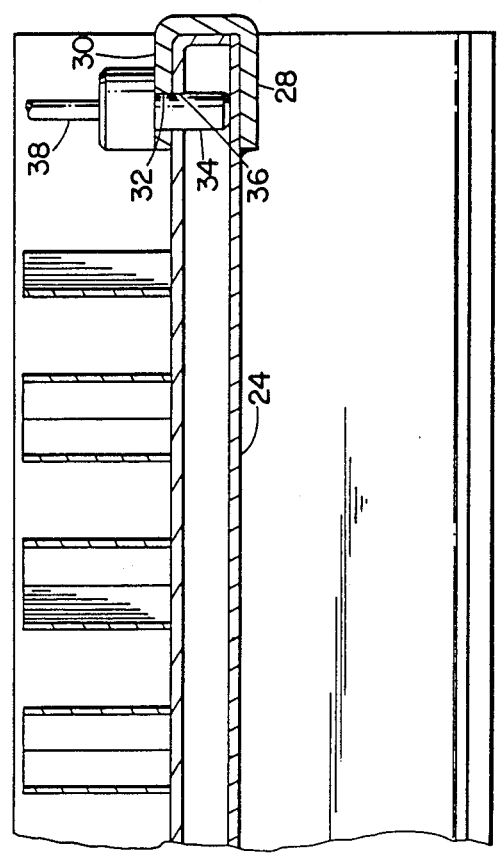
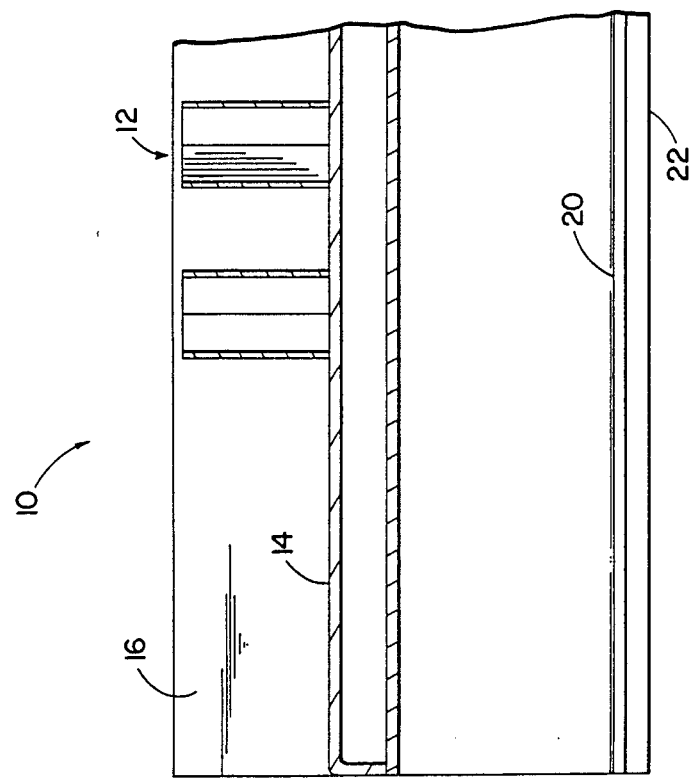
FIG. 6

DEVICE FOR FANCY CUTTING MELONS AND THE LIKE

This is a continuation of co-pending application Ser. No. 868,162 filed on May 22, 1986 in turn a continuation of Ser. No. 647,114 filed Sept. 14, 1984 both now abandoned.

BACKGROUND OF THE INVENTION

Cantaloupes, honeydew melons, etc. are conventionally severed continuously and in an annular cut around midsections in a fancy cutting operation in supermarkets, catering operations, etc. The fancy cut is usually a serration with the melon being thus split into half sections, the seeds and other material in the central portion removed and the melon thereafter filled with grapes, portions of other melons, and various other colorful fruit in a pleasing and appetizing display. When so prepared, the melons of course bring a premium price and supermarkets, caterers, etc. would be more inclined to employ a fancy cutting operation except for the extremely tedious and time consuming methods presently used. Either a simple straight knife or perhaps a knife with a "V" shaped cross section is employed and the continuous cut around the mid section of the melon is accomplished incrementally in small stabbing type cuts.

It is the general object of the present invention to provide an improved device for effecting fancy cuts around melons and the like and which is adapted for efficient and rapid cutting together with ease, convenience and safety for the user.

SUMMARY OF THE INVENTION

In fulfillment of the foregoing object and in accordance with the present invention, a device for effecting continuous fancy cuts such as serrations around melons and the like comprises an elongated substantially linear base and support member. An elongated generally linear cutter extends longitudinally and is supported on said base and support member with upper edge portions of the cutter being at least substantially continuous longitudinally and adapted to sever the skin of melons and the like. The shape of the cutter when viewed from above is such as to provide the desired type or design of preselected continuous fancy cuts around melons and the like and, preferably, the shape of the cutter takes a conventional saw-tooth configuration or serration. The base and support means extend laterally and at least slightly beyond the cutter at each side thereof so as to engage and support a melon which is rolled along the cutter with a slight downward manual pressure applied atop the melon. With the melon rolling or revolving along substantially a straight line atop the cutter, the cutter serves to progressively sever the skin of the melon in a continuous annular area around the same and provides the desired fancy cut. The height of the cutter relative to that portion of the base and support member which engages the melon is such that the melon is further and simultaneously severed to a desired depth beneath the skin whereby to permit ready separation of the melon into half sections. Thus, a simple and expeditious operation results in a rapid cutting of a number of melons or the like and the operators hands are maintained at all times atop the melons, never approaching even the general area of the cutter, whereby an extremely safe procedure is provided for.

In addition to the foregoing, the base and support member is preferably provided with a generally trough-like cross sectional configuration with opposite portions thereof extending upwardly and outwardly at gradual angles of inclination, approximately thirty degrees (30) being presently preferred. With this configuration, and with the cutter centrally located and supported atop a central portion of the base and support member, the melons may be rolled along the top of the cutter in a linear or straight line manner and the tendency of the trough is to maintain the melon in straight line or linear movement during revolution of the same. Moreover, with the angles of inclination mentioned, the foregoing tendency toward straight line revolution is achieved with melons of varying dimension. Still further, the vertical dimension or height of the cutter relative to the base and support member, and more particularly, the inclined opposite portions thereof is such as to provide for the desired depth of cut with melons of various size or dimension. That is, the skin of the melon is effectively severed and the depth of the cut is sufficient to provide for the ready separation of the melon into the desired half-section configuration.

DESCRIPTION OF THE DRAWINGS

FIG. 1 is a perspective view of the melon cutting device of the present invention.

FIG. 2 is a side view of a melon after severing into half sections.

FIG. 3 is a perspective view of a portion of the cutting device and a melon severed thereby.

FIG. 4 is an enlarged end view of the melon cutting device.

FIG. 6 is a section taken generally as indicated at 6, 6 in FIG. 5.

DESCRIPTION OF PREFERRED EMBODIMENT

Figure 5:
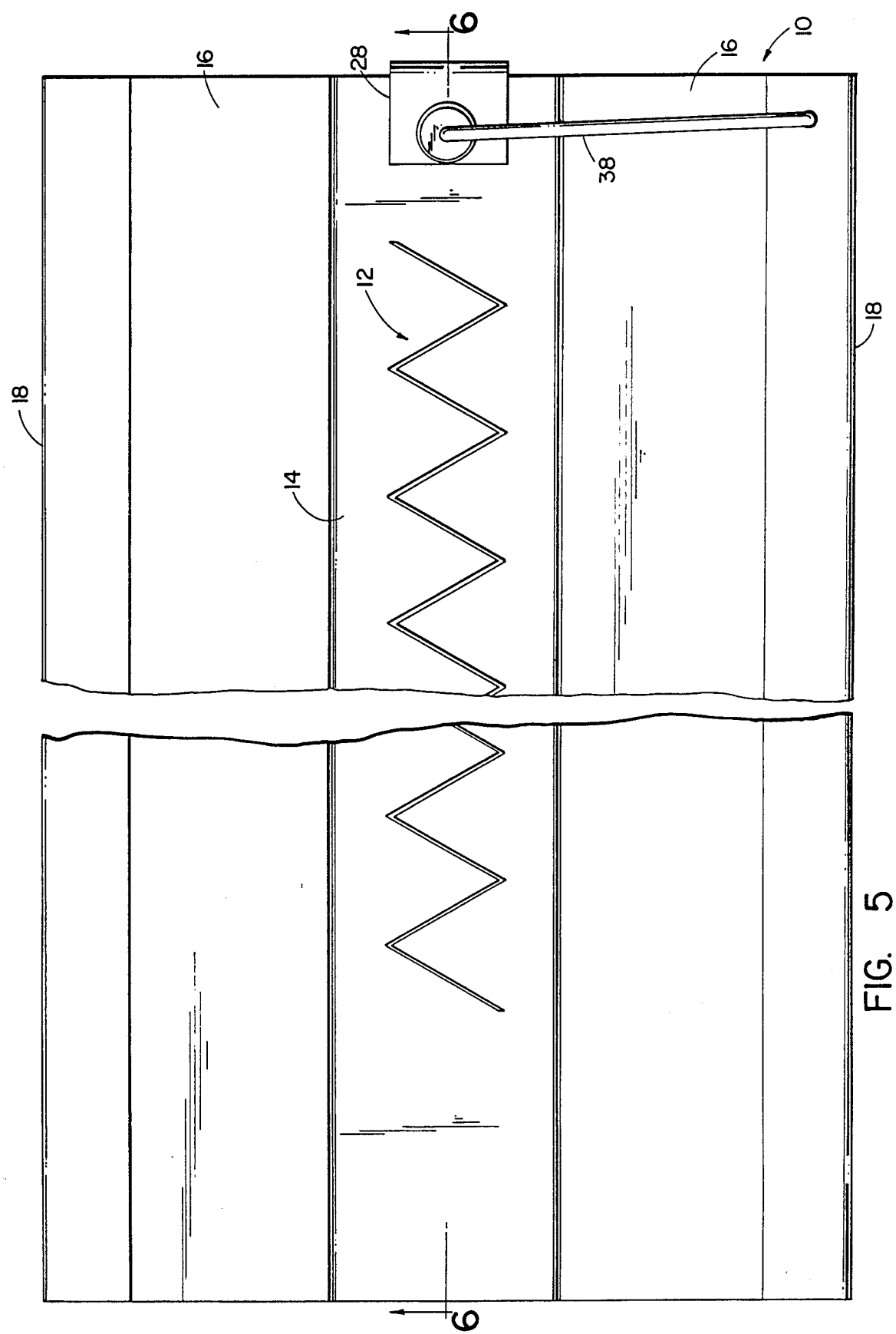
FIG. 5 is a fragmentary enlarged top view of the melon cutting device.

Referring particularly to FIG. 1, it will be observed that the melon cutting device of the present invention includes an elongated substantially linear base and support member which is indicated generally at 10 and which carries an elongated upstanding linear cutter indicated generally at 12. The base and support member 10 may vary widely in construction but is preferably of a trough-like configuration in cross section as best illustrated in FIG. 4. Thus, a generally flat central portion thereof at 14 serves as a support for the cutter 12. The central portion 14 has opposite side portions 16, 16 associated therewith and which are inclined upwardly and outwardly with respect thereto. Preferably and as shown, the opposite side portions 16, 16 are inclined upwardly and outwardly from the horizontal at approximately thirty degrees (30). Vertical side sections of the base and support member at 18, 18 support the central portion 14 and the inclined portions 16, 16 and each such side member has a short inwardly extending flange 20 carrying an anti-skid member 22 which may be of rubber or the like.

Preferably, and as shown, the central portion 14 is made separately from the opposite side portions 16, 16 of the base and support member and the base and support member has a central section 24 upon which the central portion 14 rests. Further, two short sidewalls 26, 26 confine the member 14 laterally and it may be conveniently assembled and disassembled relative to the remaining portion of the base and support member in a relative endwise movement of the elements. That is, the portion 14 carrying the cutter 12 can be removed in an endwise sliding movement for cleansing of the cutter or for other purposes and may thereafter be readily replaced in the operative position shown in FIGS. 1 and 4. Preferably, a quick connect and disconnect means is provided for securing the central portion 14 and the cutter 12 in assembled position. As shown, a small bracket takes a generally U shape at 28 and is secured at one end of the support portion 24 beneath the central portion 14. An upper arm 30 of the small U shaped member 28 has an appropriate opening 32 for receiving a lock pin 34, the latter being entered vertically downwardly through the opening 32 and extending also through a similar opening 36 in an end portion of the central portion 14 of the base and support member. Preferably, a connecting cord 38 carries the pin 34 at one end thereof and is secured at 40 to one of the side portions 16 of the base and support member to prevent loss or displacement of the pin 34.

Figure 7:
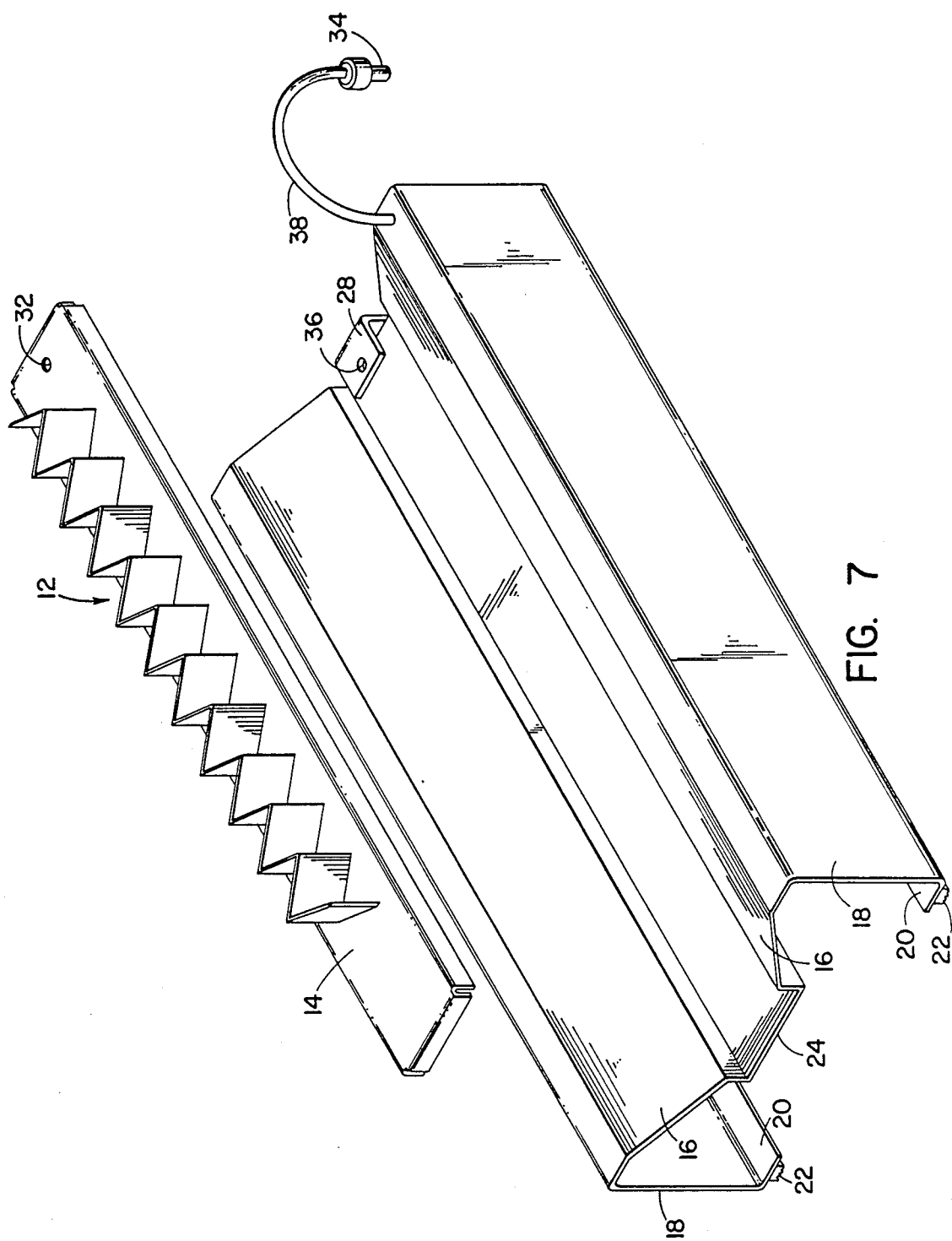
FIG. 7 is an exploded perspective view of the melon cutting device.

Reference may be had to FIG. 7 for a clear illustration of the manner in which the several parts of the device may be disassembled on disengagement of the pin 34. It is of course understood that the central portion 14 and the cutter 12 are shown above the base and support member 10 but this positioning of the member is subsequent to the removal of the same from the base and support member 10 with the member 14 first being moved in an endwise direction at least a sufficient distance to disengage the member from the U-shaped bracket member 28.

The cutter 12 which is disposed atop and supported by the central portion 14 of the base and support member provides a serration or other fancy cut around a midsection of a melon or the like as the latter is rolled or revolved therealong in a substantially straight line or in linear movement thereover. The hands of the user are positioned atop the melon and the melon is progressively rolled along in a simple, rapid and efficient cutting operation. As shown, the cutter 12 takes a conventional saw-tooth configuration viewed from above but it will of course be apparent that various other configurations may be provided such as sinusoidal, etc. The number of saw-tooth configurations may vary as desired from the number shown to 20 or more and it will be noted that the device shown has the cutter blade spaced from the end of the member 14 at a left hand or entry end thereof. That is, a melon may be placed as shown at 39 at the entry or loading end of the cutter and it may facilitate the loading and/or the initial cutting operation to have a short blank section as shown prior to the beginning of the cutting section.

The height of the upstanding cutter is also important and is established in relation to the base and support member so as to provide for the proper cutting of the melon. That is, the base and support member is provided with lateral extending portions at least slightly beyond and at each side of the cutter and as shown the portions 16, 16 extend a substantial distance beyond the cutter. In FIG. 4 it will be apparent that the position of the lower portion of the melon as indicated by the three broken lines 41, 42 and 44 is established by the side portions 16, 16. Thus, melons of varying size or dimension can be accomodated and in each instance, the relative height of the cutter 12 and the side portion 16, 16 will determined the depth of cut. When the base and support means is provided without inclined portions as at 16, 16 and the melon rests, for example, atop a flat member such as the central portion 14 the height of the blade is established relative to such flat portion. In any event, the depth of cut should be such that the skin of the melon is severed and the cut is of a sufficient depth therebeyond to provide for the ready separation of the melon into half sections as illustrated in FIG. 3, a melon being illustrated therein at the completion of a cutting operation. It is believed that the height of the cutter should be at least one half ($\frac{1}{2}$) inch and the present cutter is approximately one (1) inch high with the inclined portions 16, 16 established at approximately thirty degrees (30) from the horizontal as mentioned above. Excellent results have been achieved with these dimensional and angular relationships.

It should also be noted that the various elements of the cutting device and particularly the cutter, have at the present time been constructed from stainless steel and such construction is preferred. The convenience of cleaning and the general sanitary advantages of stainless steel are of course well known.

From the foregoing it will be apparent that a cutting device having a high degree of safety, ease and convenience in use, and which is capable of rapid and efficient cutting operations has been provided. Melons of varying size may be placed at the entry end of the device sequentially, rapidly rolled along the length of the cutter with the trough guiding and urging the melons toward a straight line progression in their rolling or revolving movement and efficient cutting around the midsections of the melons results. Cutting time is reduced to a mere fraction of the cutting time involved with the prior techniques.

We claim:

1. A device for effecting continuous fancy cuts such as saw-tooth serrations around melons and the like; said device comprising a stationary and elongated substantially linear trough-like base and support member having a central generally rectangularly shaped groove opening upwardly, a removable portion of said base and support member having a generally rectangular cross section adapted to removably and slidably fit into said groove, a centrally located elongated upstanding substantially linear and stationary cutter having similar interconnected alternating diagonal components of substantially uniform height, said cutter extending longitudinally atop and being supported on said removable central portion of said base and support member, upper edge portions of said cutter being exposed upwardly and being at least substantially continuous longitudinally, and the shape of said cutter when viewed from above being such as to provide a saw tooth cut around a melon, said base and support means extending laterally outwardly and upwardly from each side of said cutter and being exposed upwardly so as to engage and support a melon rolled manually along the cutter with a slight downward pressure applied atop the melon and with the melon revolving along substantially a straight line, the cutter thus serving to progressively sever the skin of the melon continuously around the same in the desired fancy cut, and the height of the cutter relative to the portion of the trough-like base and support member which engages the melon being such that the melon is severed through the skin to permit ready separation of the melon into half sections, and a means for removably securing said central portion of said base and support member at least against relative horizontal sliding movement.

2. A device for effecting fancy cuts around melons as set forth in claim 1 wherein said securing means takes the form of a removable pin-hole locking device.

3. A device for effecting fancy cuts around melons as set forth in claim 2 wherein said cutter is somewhat shorter than the central portion of the base and support member to provide a melon starting area adjacent one end of the cutter.

* * * * *